Dec. 18, 1923.
E. C. WENTE
EQUALIZING NETWORK
Filed July 6, 1921
1,478,078
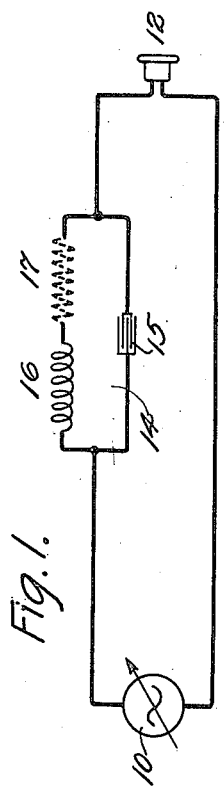
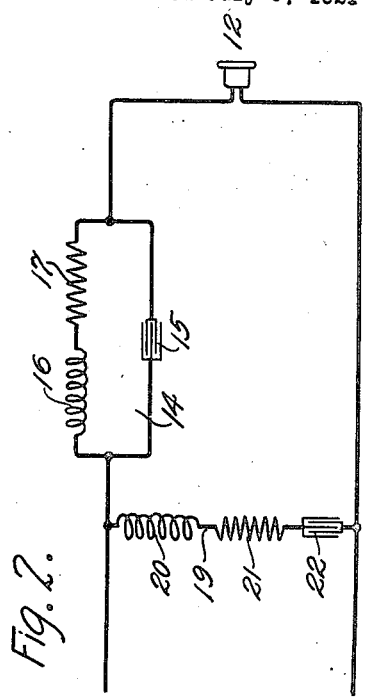
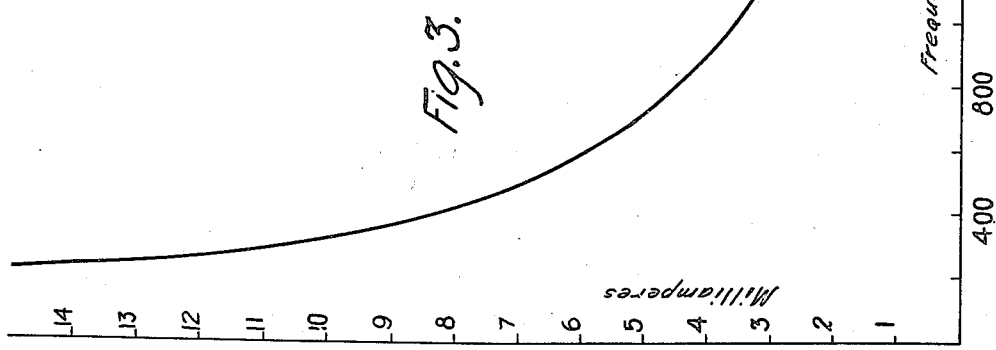
Inventor:
Edward C. Wente.
by W. E. Beatty. Att'y.

Patented Dec. 18, 1923.

1,478,078

UNITED STATES PATENT OFFICE.

EDWARD C. WENTE, OF PORT WASHINGTON, NEW YORK, ASSIGNOR TO WESTERN ELECTRIC COMPANY, INCORPORATED, OF NEW YORK, N. Y., A CORPORATION OF NEW YORK.

EQUALIZING NETWORK.

Application filed July 6, 1921. Serial No. 482,729.

*To all whom it may concern:*

Be it known that I, EDWARD C. WENTE, a citizen of the United States, residing at Port Washington, in the county of Nassau, State of New York, have invented certain new and useful Improvements in Equalizing Networks, of which the following is a full, clear, concise, and exact description.

This invention relates to circuits for equalizing the translation of electric waves into sound waves by the use of receivers which are unequally responsive to different frequencies. It is well known that the diaphragm of an undamped receiver is likely to have a period of free vibration and more efficiently transmits waves at this frequency and adjacent frequencies than at other frequencies. The frequency of natural resonance can be changed by air damping, and, if desired, can be removed outside of the range of important voice frequencies. This, however results in a lessened efficiency of the receiver. An object of this invention is to control the circuit currents entering a receiver having a natural period in the frequency range to be utilized, in such a way that the sound waves produced are substantially proportional to the currents received from a source.

This may be accomplished by the use of a circuit comprising an inductance and capacity in parallel and connected in series with the receiver, or by a series arrangement of inductance and capacity in parallel to the receiver, or by a combination of both. These combinations of inductance and capacity are tuned to the frequency at which the receiver is more efficient and resistances added to flatten out the resonance curve of the tuned circuit to correspond to the reciprocal of the similar curve of the receiver.

The invention will be more fully understood from the following detailed description and claims taken in connection with the accompanying drawings, in which Fig. 1 is a diagrammatic view illustrating one form of the invention, Fig. 2 is a modification, and Fig. 3 is a diagram illustrating a characteristic of the receiver.

In the curve of Fig. 3, the abscissæ represent the frequency and the ordinates represent current in milliamperes required to produce uniform velocity of vibration of the diaphragm of a particular receiver. At the natural frequency of this receiver, namely 2986 cycles, very much less current was required to give the same diaphragm velocity than was required at 400 cycles. This condition can be provided for by a circuit such as that shown in Fig. 1. The circuit comprises a multi-frequency source of currents 10 which might be, for example, a variable oscillation generator, a telephone transmitter, or the like, a receiver 12, and an equalizing network 14. The network 14 comprises a condenser 15 in parallel with an inductance 16 which has in series a resistance indicated in dotted lines at 17. In this case it was not necessary to employ a separate resistance 17, since the resistance of the winding 16 was sufficient for the purpose, the value of the inductance used being .315 henries and of the capacity .009 microfarads.

While the circuit of Fig. 1 is sufficient for connection to certain sources or alternating currents, with other sources, such as a telephone line, it is desirable that the impedance connected to the line be nearly constant at all frequencies. Obviously the impedance of the circuit of Fig. 1 is much greater at the resonant frequency than at other frequencies. To provide a uniform impedance circuit the series tuned circuit comprising an inductance 20, resistance 21 and condenser 22, as shown in Fig. 2, is employed. This circuit is tuned to the same frequency as network 14, but since its impedance is low at the frequencies for which the impedance of network 14 is high, the impedance of the combination is substantially uniform.

The attenuation characteristics of network 19 are the same as those of network 14, and network 19 may be employed alone where considerations of impedance are immaterial.

While the networks 14 and 19 have been described as being designed so that uniform diaphragm velocity may be obtained, it is obvious that the network constants may be given such values that uniform amplitude of vibration may be obtained, as is desirable in the case of a head receiver held closely to the ear. Of course any other characteristic of the receiver response may be equalized by the use of this invention provided its normal irregularity is due to a condition of resonance or a similar condition.

The invention may also be used with a transmitter, or other device for converting one form of energy into another, one of the forms being electrical, as well as with a receiver as above described.

What is claimed is:

1. In combination, a receiver adapted to be connected to a source of multi-frequency currents, the sound producing portion of said receiver being non-uniformly responsive to currents of different frequencies, and means for equalizing said response, said means comprising a parallel tuned circuit in series with said receiver and a series tuned circuit in parallel with a path comprising said receiver.

2. A circuit in accordance with claim 1 in which each of said tuned circuits comprises a resistance for damping the resonance.

3. In combination, a receiver adapted to be connected to a souce of multi-frequency currents, the sound producing portion of said receiver being non-uniformly responsive to currents of different frequencies, and means for equalizing said response, said means comprising a parallel tuned circuit in series with said receiver and a series tuned circuit in parallel with a path comprising said parallel tuned circuit and said receiver.

4. A circuit in accordance with claim 3 in which said tuned circuits comprise resistance, inductance and capacity of such values that the impedance of the circuit is substantially constant throughout the frequency range of said source.

5. In a system for wave transmission, said system normally discriminating in favor of certain frequencies, an equalizing network comprising two tuned circuits tuned to the frequency normally transmitted with the greatest efficiency, the impedance of one of said tuned circuits being complementary to that of the other of said tuned circuits so that the impedance of the combination is substantially uniform throughout a wide range of frequencies.

6. In a system for wave transmission, said system normally discriminating in favor of certain frequencies, a net work for equalizing transmission comprising in one path a resistance, an inductance and a capacity, and in a path in parallel to said first path a capacity shunted by a resistance and an inductance.

7. In a system for wave transmission, said system normally discriminating in favor of certain frequencies, a network for equalizing transmission comprising in one path a resistance, an inductance and a capacity, and in a path in parallel to said first path a capacity shunted by a resistance and an inductance, said reactances having such values and being so arranged as to render each of said paths resonant to the frequency transmitted with the greatest efficiency.

In witness whereof, I hereunto subscribe my name this 1st day of July, A. D., 1921.

EDWARD C. WENTE.